C. C. COLLETTE.
PROCESS OF SECURING WASHERS TO BOLTS, RIVETS, AND THE LIKE.
APPLICATION FILED JAN. 27, 1921.

1,435,586. Patented Nov. 14, 1922.

INVENTOR.
Clarence C. Collette
BY
Owen Owen & Crampton
ATTORNEYS.

Patented Nov. 14, 1922.

1,435,586

UNITED STATES PATENT OFFICE.

CLARENCE C. COLLETTE, OF AMSTERDAM, NEW YORK.

PROCESS OF SECURING WASHERS TO BOLTS, RIVETS, AND THE LIKE.

Application filed January 27, 1921. Serial No. 440,315.

*To all whom it may concern:*

Be it known that I, CLARENCE C. COLLETTE, a citizen of the United States, and a resident of Amsterdam, in the county of Montgomery and State of New York, have made an Invention Appertaining to Processes of Securing Washers to Bolts, Rivets, and the like; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a retaining member in the form of a bolt or rivet having a relatively large circular head that may be readily and cheaply formed. In ordinary bolt and rivet manufacture the head is usually upset, hot or cold, by suitable machine tools, and is formed of the same material and integral with the shank of the bolt. My invention provides a means whereby a washer considerably larger than the bolt and the head may be securely attached or connected to the bolt, and yet one which is readily secured to the bolt.

Retaining members of different forms and for different purposes may contain the invention. For purposes of illustration I have selected a bolt containing the invention. The structure selected is shown in the accompanying drawings.

Figure 1:
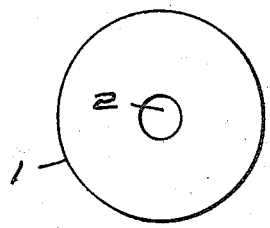
Figure 5:
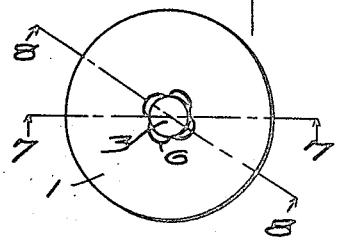
Figure 2:
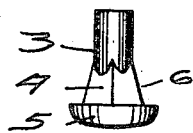
Figure 6:
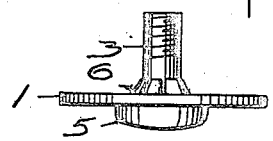
Figure 3:
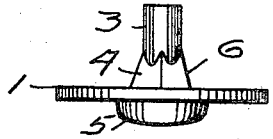
Figure 7:
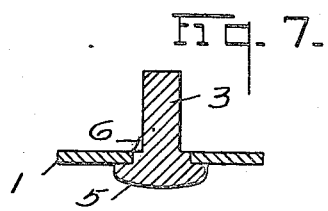
Figure 4:
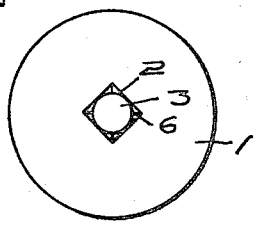
Figure 8:
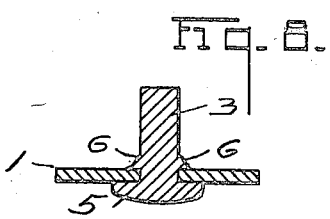

Figure 1 of the drawings illustrate a top view of a washer that is secured to the bolt and forms a part of the head of the bolt. Fig. 2 is an enlarged view of the bolt as originally formed. Fig. 3 shows the bolt when first inserted in the washer shown in Fig. 1. Fig. 4 is a side view showing the bolt inserted in the washer. Fig. 5 is a top view showing the bolt attached to the washer. Fig. 6 is a side view showing the bolt attached to the washer. Fig. 7 is a sectional view taken on the line 7—7 indicated in Fig. 5, and Fig. 8 is a sectional view taken on the line 8—8 indicated in Fig. 5.

1 is a washer having a small central opening 2 that is about the size of the shank 3 of the bolt. The bolt 3 is provided with a portion 4 having sloping sides having plane surfaces and a head 5. The portion 4 is located between the shank 3 and the head 5. The bolt 3 is pushed into the hole 2 until the head 5 is pressed against the surface of the washer 1. The corners of the portion 4 crowd the metal of the washer 1 back so as to form a square opening in the washer as illustrated in Fig. 3. The corner 6 of the portion 4 is then spun over, that is, pressed in the spinning operation so as to lie over between the corners of the opening formed in the washer 1 as illustrated in Fig. 5. The corners 6 form lugs that tightly clamp the washer between the head and the lugs as shown in Figs. 5 to 8 inclusive somewhat exaggerated.

I have thus provided an efficient means for forming retaining devices of different kinds, having broad heads, at a low cost of production.

I claim:

The process of securing washers to bolts, rivets and the like to form heads, which consists in forming on the bolts, rivets and the like, a pyramidal shaped portion on the shank in juxtaposition to the head, forcing the washer over the pyramidal portion and against the head, and spinning the corners of the pyramidal portion over the portions of the washer adjoining the corners of the angular opening formed by the corners of the said pyramidal shaped portion.

In testimony whereof I have hereunto signed my name to this specification.

CLARENCE C. COLLETTE.